United States Patent [19]

Shinohara et al.

[11] Patent Number: 4,634,848

[45] Date of Patent: Jan. 6, 1987

[54] CARD INFORMATION SELECTING SYSTEM

[75] Inventors: Yoshitsugu Shinohara, Shiga; Masazumi Ichihashi, Kurita, both of Japan

[73] Assignee: Omron Tateisi Electronics Co., Kyoto, Japan

[21] Appl. No.: 579,998

[22] Filed: Feb. 14, 1984

[30] Foreign Application Priority Data

Feb. 15, 1983 [JP] Japan ................. 58-23630
Feb. 15, 1983 [JP] Japan ................. 58-23631

[51] Int. Cl.$^4$ ............................................. G06K 7/08
[52] U.S. Cl. ......................................... 235/449; 235/379
[58] Field of Search ............... 235/379, 2; 360/77

[56] References Cited

U.S. PATENT DOCUMENTS

| | | | |
|---|---|---|---|
| 3,263,031 | 7/1966 | Welsh | 360/77 |
| 3,434,130 | 3/1969 | Lemelson | |
| 4,016,405 | 4/1977 | McCune | 235/379 |
| 4,254,329 | 3/1981 | Gokey | 235/494 |
| 4,321,672 | 3/1982 | Braun | 235/379 |
| 4,406,629 | 9/1983 | Yeh | 360/2 |

Primary Examiner—Harold I. Pitts
Attorney, Agent, or Firm—Stevens, Davis, Miller & Mosher

[57] ABSTRACT

Card information selecting system capable of accessing a card provided with a plurality of information channels corresponding to different transactions, includes reading means for reading information recorded on the card, selecting means for designating at least one of the information channels, writing means for recording information on the card, and processing means associated with the selecting means for reading information or recording the predetermined information on the selected channel.

8 Claims, 9 Drawing Figures

CARD INFORMATION SELECTING SYSTEM

BRIEF SUMMARY OF THE INVENTION

This invention relates to a card information selecting system for selectively processing information on a recording media, and more particularly to an improved card information selecting system in which the recording media is provided with a plurality of information channels to be selectively read or recorded by the system.

A card transaction system is well known in which a plurality kinds of transaction magnetic cards are separately issued for cash card, credit card, loan card, member card or the like by different transaction companies. Accordingly, a card user must carry many cards for the respective transactions, and find one card before performing one of the transactions, which is troublesome to the user.

It is, therefore, a primary object of this invention to provide a card information selecting system which selects one of predetermined information channels on a single recording card to read or record information on the selected information channel.

It is a further object of this invention to provide a card information selecting system in which the respective information channels correspond to the respective operations or transactions so that the single card can be commonly used as a plurality of operation or transaction cards.

According to this invention, there is provided a card information selecting system comprising card accessing means for accessing a card provided with a plurality of information channels, designating means for designating at least one of the information channels, and processing means for processing information on the designated information channel through the card accessing means.

Other objects as well the numerous advantages of the card information selecting system according to this invention will become apparent from the following detailed description and the accompanying drawing, in which:

DETAILED DESCRIPTION

Figure 1:
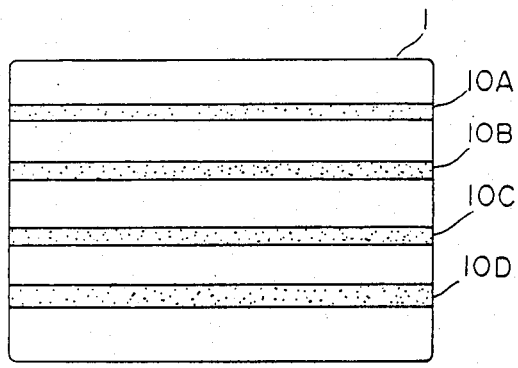
FIG. 1 is a plan view of a magnetic card accessed by a card information selecting system as a preferred embodiment of this invention.
Figure 2:
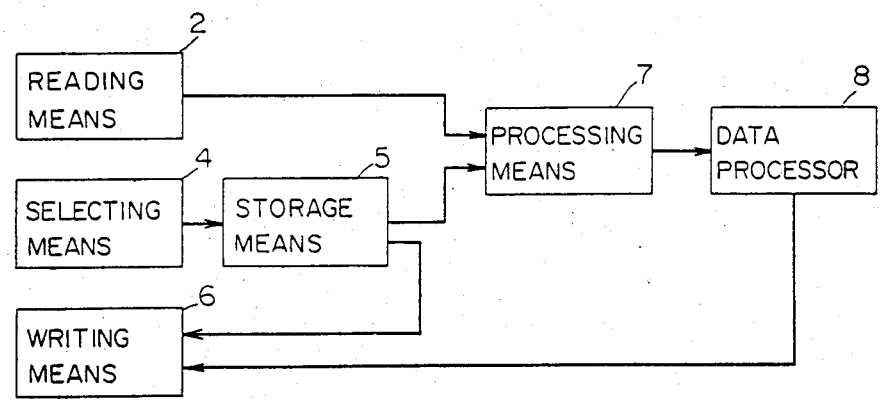
FIG. 2 is a schematic block diagram of the card information selecting system.

Returning, now, to FIG. 1 there is shown a reverse surface of a magnetic stripe card 1 as a recording media accessed by a card information selecting system of FIG. 2 as a preferred embodiment of this invention. The card 1 includes four magnetic stripes 10A, 10B, 10C and 10D as first, second, third and fourth information channels which store information of cash transaction, loan transaction, credit transaction and season ticket. Though a magnetic card is employed in this embodiment, any other recording media, such as a laser card capable of storing information on an optical laser stripe at a plurality information storage channel sections, may be alternatively employed as a recording media of this invention.

FIG. 2 illustrates a basic construction of the card information selecting system accessing the card 1 of FIG. 1. The system includes card reading means 2 provided with a plurality of magnetic heads for simultaneously reading information on the channels 10A through 10D of the card 1, channel selecting or designating means 4 for selecting or designating one of the information channels in accordance with a desired transaction, storage means 5 for storing the selected channel by the selecting means 4, writing means 6 for recording or revising information on the channels of the card 1, and processing means 7 for generating output data of the read information on the selected channel to a data processor 8 or applying information from the processor 8 to the writing means 6. Thus, the processing means 7 processes information on the selected information channel through the card reading means 2 or the writing means 6.

Figure 3:
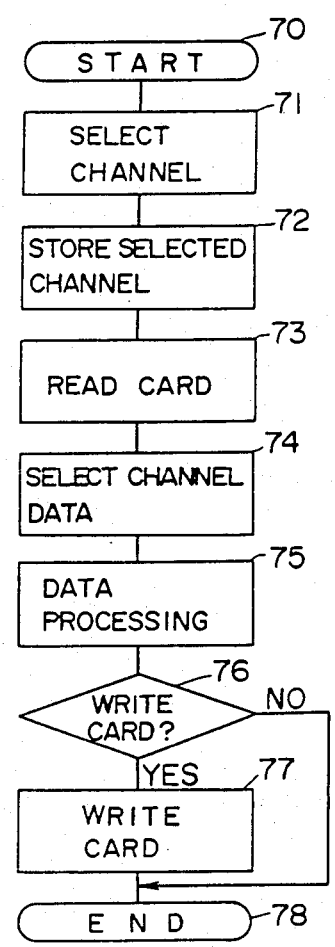
FIG. 3 is a flow chart illustrating the operation of the system.

FIG. 3 illustrates the operations of the system of FIG. 2. After a card user has inserted the card 1 into the system (step 70), one of the information channels is selected or designated by the selecting means 4 to start a desired transaction of the card (step 71). The selection by the selecting means is performed by a manual operation by the card user or an operator of the system, but may be performed by an automatic operation by a predetermined operation program stored in the system. In a step 72, the selected channel by the selecting means 4 is sent to the storage means 5. In a step 73, the information recorded on all information channels 10A through 10D of the card 1 is read by the card reading means 2, and, in a step 74, only the information read from the channel selected by selecting means 4 is selected by the processing means 7 associated with the storage means 5 for application to the data processor 8. In a step 75, the output information from the means 7 is processed by the processor 8 so as to perform the desired transaction available to the card 1. In a step 76, the processor 8 judges if the information on the inserted card is required to be revised in accordance with completion of the desired transaction. If predetermined information, for example, a balance amount, a number of use and so on, should be recorded on the selected channel of the card, the information is applied to the writing means 6 through the processing means 7 (step 77). The writing means 6 is provided with a plurality of recording magnetic heads (four heads in this embodiment) one of which is designated by the storage means 5 through the gate means 7 so as to record the information on the selected channel by the selecting means 4. After recording the information on the card, the card 1 is returned to the card use (step 78). If any information on the card is not necessary to be revised or recorded in the step 76, the card is returned to the user without changing the information on the card. Though four reading heads and four recording heads are employed in the reading means 2 and the writing means 6, a single writing head and a single recording head may be commonly employed by shifting the heads to one of the information channels or magnetic stripes on the card which is designated by the means 4 or 5. Moreover, only a single magnetic head may be commonly used as such reading and recording heads, if desired.

Figure 4:
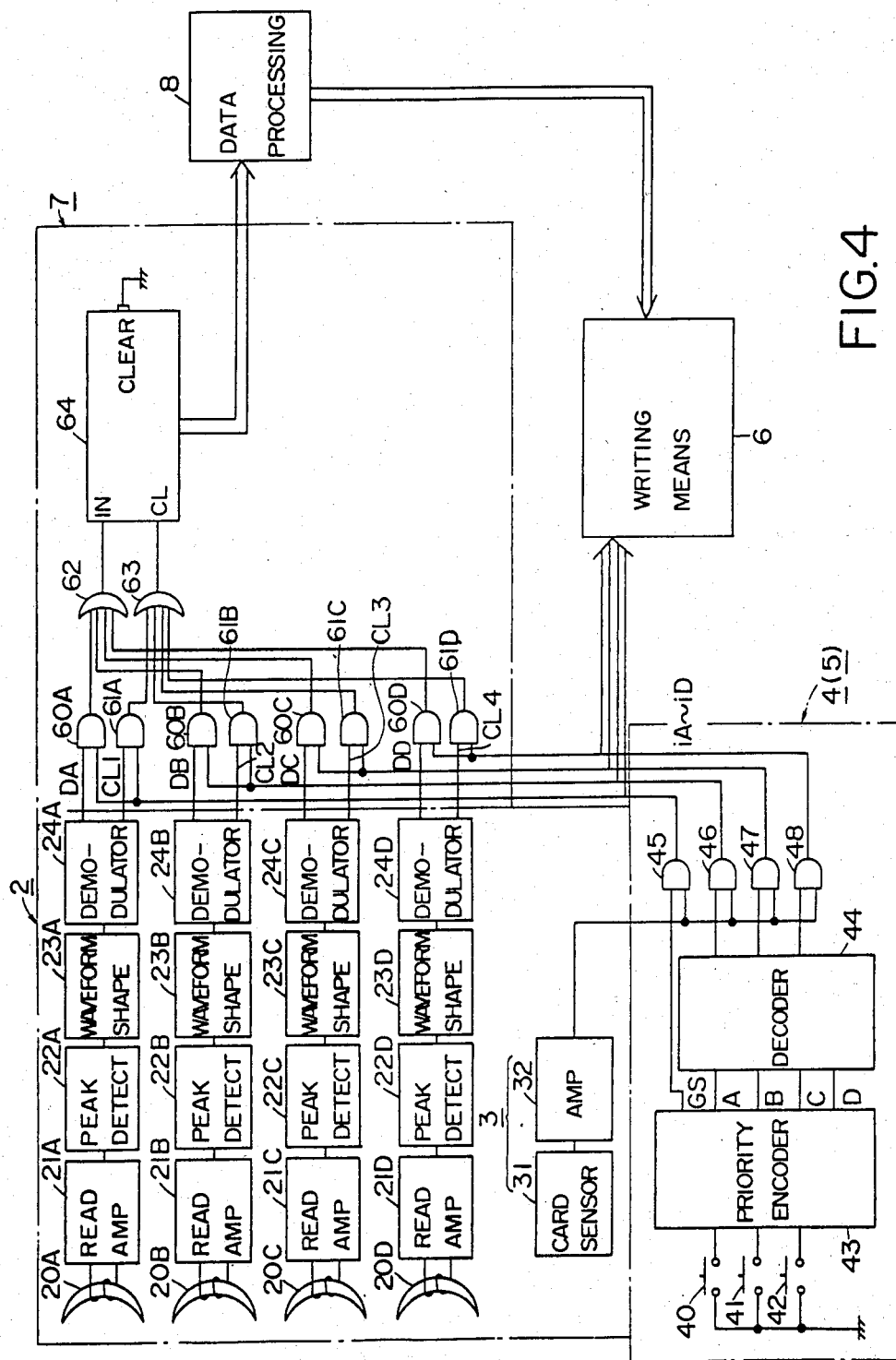
FIG. 4 is a partially detailed block diagram of the system.

In FIG. 4, the system of FIG. 2 is illustrated in detail.

The reading means 2 of FIG. 2 includes four heads 20A to 20D associated with read amplifiers 21A to 21D, peak detection circuits 22A to 22D, waveform shaping circuits 23A to 23D, and demodulators 24A to 24D so as to generate the respective read data DA to DD to the processing means 7 together with reading clock signals CL1 to CL4. The reading means 2 further includes a card sensor 3 consisting of a card position sensor 31 and an amplifier 32 for sensing if any card is inserted into the system and detecting a position where the inserted card starts to be read. A sensed output signal from the amplifier 32 is applied to the selecting means 4.

The selecting means 4 includes three push-button switches 40 to 42, a priority encoder 43, a decoder 44, and four AND gates 45 to 48 for applying control signals iA to iD to the processing means 7.

The processing means 7 includes gates 60A to 60D passing the read data DA to DD and gates 61A to 61D receiving the clock signals CL1 to CL4 in accordance with control signals iA to iD, which respectively correspond to the head 20A to 20D.

The push switches 40 to 42 are provided with a push-on-and-push-off mechanism, so that they keep on or off status. Thus, the switches further provide the storage means 5 of FIG. 2.

Where the switches 40 to 42 are all "off", the encoder 43 at an output terminal GS generates a logic H (high). Then, the AND gate 45 generates a logic H, viz., the control signal iA, and the rest gates 46 to 48 generate a logic L (low), so that only gates 60A and 61A are actuated to apply the read data DA and the clock signal CL1 to a shift register 64 through OR gates 62 and 63. 8-bit data from the register are applied to data processor 8.

Where the switch 40 is pushed or "on", the AND gate 46 generates a logic H, viz., the control signal iB, to open the gates 60B and 61B for the data from the head 20B. Likewise, the depression of the switch 41 or 42 opens the gates 60C and 61C or 60D and 61D for the data from the head 20C or 20D.

Thus, the operations from step 70 to step 74 are performed. The writing means 6 also includes AND gates similar to the gates 60 and 61 applied by the control signals iA to iD from the gates 45 to 48 so that after a desired transaction has been performed, predetermined recording information from the data processor 8 is recorded on the selected information channel of the card.

Thus, according to the card selecting system of this embodiment, the card user has only to carry only one card for any transactions necessary to him, and one of transactions on the card may be selected by the system so as to complete the selected transaction.

If desired, the system of FIG. 2 may be modified to a card reader by omitting the writing means 6 or to a card issuing machine for issuing or writing a card by omitting the reading means 2 and the gate means 6.

Figure 5:
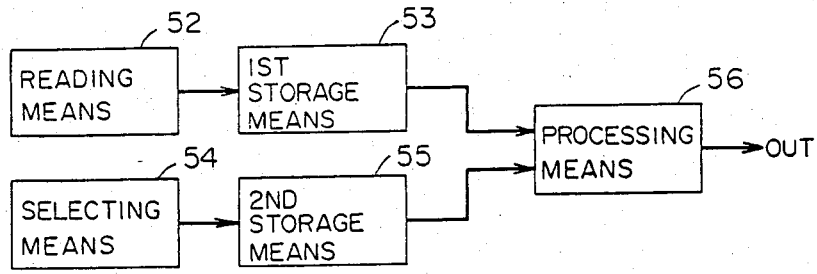
FIG. 5 is a schematic block diagram of a card information selecting system as another embodiment of this invention.
Figure 6:
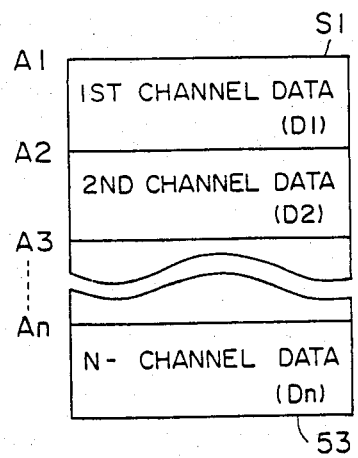
FIG. 6 illustrates a storage area of first storage means employed in the system of FIG. 5.
Figure 7:
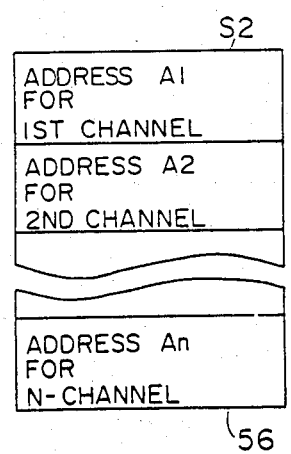
FIG. 7 illustrates an address data storage area of the processing means of FIG. 5.

In FIG. 5, there is shown a basic construction of a card information selecting system as another embodiment of this invention. The system is adapted to access a magnetic card provided with a plurality of information channels, and includes card reading means 52 for reading information on the respective information channels, first storage means 53 at its data storage area S1 having addresses A1 to An for storing the respective read information D1 to Dn from the respective information channels (see FIG. 6), selecting means 54 for selecting one of the information channels in accordance with a desired transaction by a card user, second storage means 55 for storing the selection of the channel, and processing means 56 for reading the information stored in the storage S1 at an address thereof corresponding to the selected channel stored in the second storage means 55 and generating data of the read information. FIG. 7 shows an address data storage area S2 of the processing means 56. For example, if the first information channel of the card by the selecting means 54, the first address A1 of the storage S1 is designated by the first storage means 53 so that the first channel data D1 stored at the address A1 are read out by the processing means 56. The read data are generated from the means 56 for application to its peripheral associated circuit to complete the desired transaction.

Figure 8:
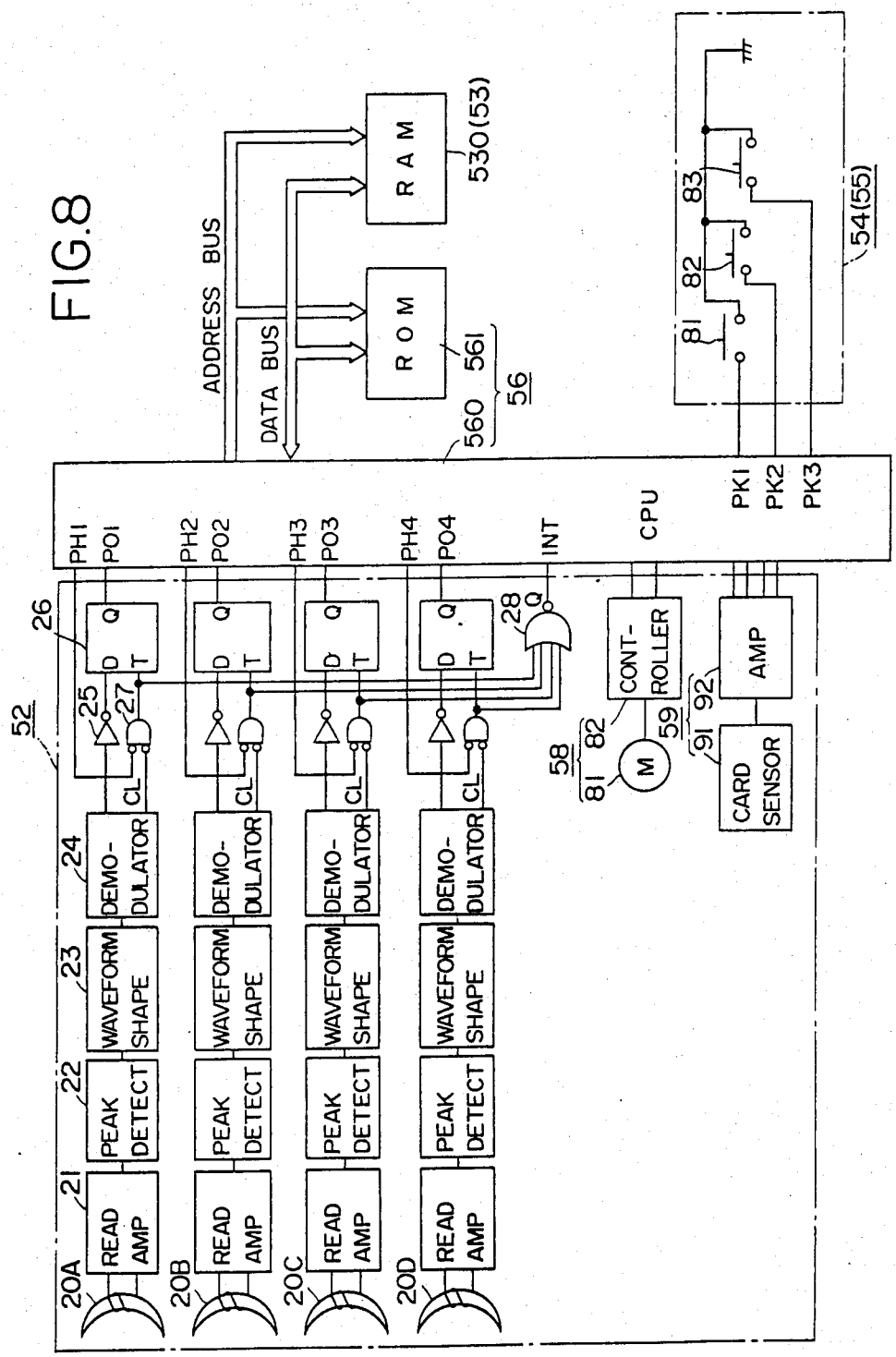
FIG. 8 is a detailed block diagram of the system of FIG. 5.

FIG. 8 illustrates a detailed construction of the system of FIG. 5, which is designed to access four magnetic stripes on the card 1 of FIG. 1. The card reading means 52 includes four magnetic heads 20A to 20D. The selecting means 54 includes three push-button switches 81 to 83 each having self keeping mechanism as illustrated in FIG. 4, so that it also functions as the second storage means 55. The processing means 56 includes a central processing unit (CPU) 560 and a read-only-memory (ROM) 561 storing a program to execute operations of FIG. 9. The first storage means 53 includes a random-access-memory (RAM) 530 storing the respective channel data read from the card of FIG. 1 by the reading means 52 as exemplarily illustrated in Fig. 6.

The reading means 52 includes heads 20A to 20D, read amplifiers 21, peak detection circuits 22, waveform shaping circuit 23, and demodulators 24. The respective read data from the demodulators 24 are applied to input terminals D of flip-flops 26 through NOT circuits 25. The respective demodulators 24 also generate clock signals CL for application to the respective gate circuits 27 which are gated by sampling signals generated from terminals $PH_1$ through $PH_4$ of CPU 560. The gate circuits 27 generate their outputs for application to T input terminals of the flip-flops 26 and OR gate 28. The OR gate 28 generates an interrupting signal Q applied to an input terminal INT of the CPU 560 so that the CPU 560 successively read the sampled read data from output terminals Q of the flip-flops 26 to be written into the RAM 30 through data bus.

A motor 81 and a control circuit 82 constitute a card conveyor 58. A card sensing 59 having a card position sensor 91 and an amplifier 92 sense the presence of a card and a position of the card to be read of the recorded data thereof.

Figure 9:
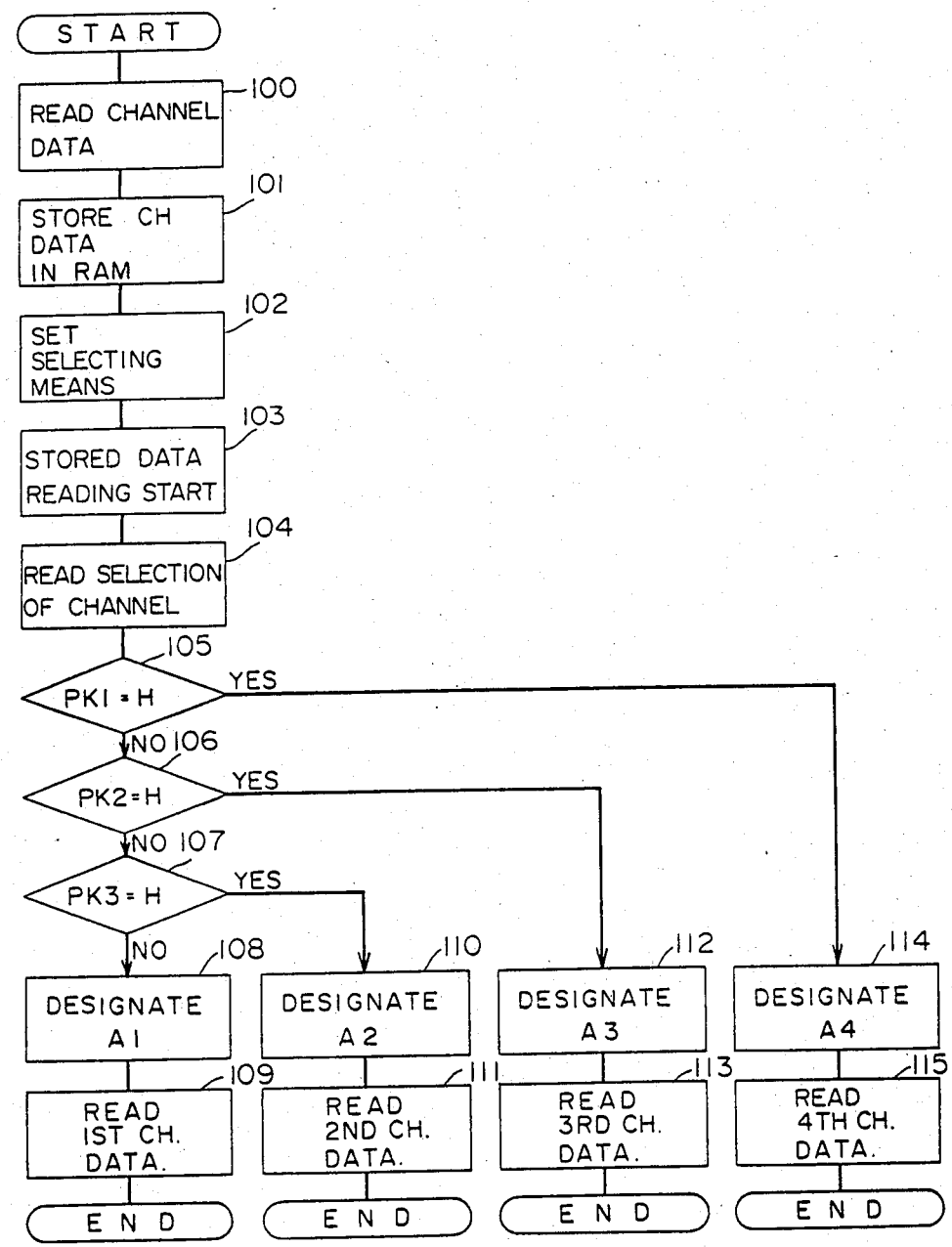
FIG. 9 is a flow chart illustrating the operation of the system of FIG. 8.

FIG. 9 illustrates the operations performed by the system of FIG. 8. In a step 100, the heads 20A to 20D scan the respective magnetic stripes or information channels 10A to 10D of the inserted card 1 to the system to read the respective channels data. In a step 101, the respective read data are stored into the RAM 530 for each information channel by the CPU 560. In a step 102, the selecting means having the switches 81 to 83 is set to a desired position with accordance with a desired transaction by an operator of the system. The depression of the switch 81, 82 or 83 provides input terminal PK1, PK2 or PK3 with a logic H. In a step 103, the CPU 560 starts to read the stored channel data from the RAM 530 at the address corresponding to the channel designated by the selecting means 54.

Where any of the switches 81 to 83 is not pushed, each of inquiry steps 105, 106 and 107 produces a NO reply so that a sequence from the step 104 flows to a step 108. In the step 108, the address $A_1$ is referred from the address data area S2 by the CPU 560 associated with the selecting means 54 (55), and then, in a step 109, the first channel data D1 stored in the RAM 530 at the address A1 are read out by the CPU 560 for application to the peripheral associated circuit.

Where the switch 83 is depressed, the inquiry step 107 produces a YES reply for application to a step 110 in which the address $A_2$ is referred so as to read the second channel data D2 by the CPU in a step 111 Where the switch 82 is depressed, a YES reply is produced from the step 106, so that in a step 112 the address A3 is designated for the third channel data D3. Where the switch 81 is depressed, a YES reply is produced from the step 105, so that in a step 114 the address $A_4$ is designated for the fourth channel data D4.

Since the system of this embodiment is designed to store all channel data in the storage (53), more than one transaction may be simultaneously performed, so that multiple transactions are quickly performed.

It should be understood that the above description is merely illustrative of this invention and that many changes and modification may be made by those skilled in the art without departing from the scope of the appended claims.

What we claim is:

1. A system for reading a plurality of information channels provided on a card, each corresponding to a respective transaction type, said system comprising:
    a card reader comprising:
        a plurality of reading heads respectively associated with said information channels;
        a plurality of signal processing circuits respectively connected to the outputs of said reading heads; and,
        a card sensor for sensing when a card inserted into said card reader is in a position to be read;
    means responsive to said card sensor for causing said reading heads to read information recorded on all of said information channels and for storing as data at respective storage locations signals at the outputs of said plurality of signal processing circuits;
    means for selecting an information channel corresponding to a desired transaction; and,
    means responsive to said selecting means for extracting for processing stored data corresponding to a selected channel.

2. A system as in claim 1, wherein each of said signal processing circuits comprises an amplifier connected to the output of a reading head, a peak detector connected to the output of the amplifier, a waveform shaped connected to the output of the peak detector, and a demodulator connected to the output of the waveform shaper.

3. A system as in claim 1 wherein said channel selection means comprises a plurality of push button on/off switches, each associated with a selectable information channel.

4. A system as in claim 3 wherein each of said switches has a push-on and push-off mechanism, the push-on and push-off mechanism of said switches serving to store data representing a selected channel.

5. A system for reading a plurality of information channels provided on a card, each corresponding to a respective transaction type, said system comprising:
    a card reader comprising;
        a plurality of reading heads respectively associated with said information channels;
        a plurality of signal processing circuits respectively connected to the outputs of said reading heads; and,
        a card sensor for sensing when a card inserted into said card reader is in a position to be read;
    a channel selection means for selecting an information channel; and,
    a processor means coupled to outputs of said signal processing circuits, said card sensor and said channel selection means, said processor means causing said reading heads to read said associated information channels and storing data from said read information channels appearing at the outputs of said processing circuits in respective storage locations, when a card inserted into said reader is in a readable position, said processor means being responsive to said channel selection means to extract for processing stored data from a channel selected by said selecting means.

6. A system as in claim 5, wherein each of said signal processing circuits comprises an amplifier connected to the output of a reading head, a peak detector connected to the output of the amplifier, a waveform shaper connected to the output of the peak detector, and a demodulator connected to the output of the waveform shaper.

7. A system as in claim 1 further comprising means for storing data representing an information channel selected by said selecting means, said extracting means extracting said stored information channel data in accordance with stored selected channel data.

8. A system as in claim 7, wherein said extracting means stores addresses corresponding to said storage locations and in response to said selecting means uses a said address to extract data corresponding to a selected channel.

* * * * *